(12) United States Patent
Didion et al.

(10) Patent No.: US 10,087,778 B2
(45) Date of Patent: Oct. 2, 2018

(54) WALL FOR A HOT GAS CHANNEL IN A GAS TURBINE

(71) Applicant: Ansaldo Energia Switzerland AG, Baden (CH)

(72) Inventors: Christoph Didion, Wettingen (CH); Herbert Brandl, Waldshut-Tiengen (DE); Magali Cochet, Brugg (CH); Rene Koehnke, Niederweningen (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 306 days.

(21) Appl. No.: 14/993,580

(22) Filed: Jan. 12, 2016

(65) Prior Publication Data

US 2016/0208649 A1 Jul. 21, 2016

(30) Foreign Application Priority Data

Jan. 20, 2015 (EP) .................................... 15151809

(51) Int. Cl.
*F01D 11/08* (2006.01)
*F01D 25/14* (2006.01)
(Continued)

(52) U.S. Cl.
CPC .............. *F01D 25/14* (2013.01); *F01D 11/08* (2013.01); *F01D 25/12* (2013.01); *F02K 1/822* (2013.01);
(Continued)

(58) Field of Classification Search
CPC .......... F01D 5/186; F01D 5/188; F01D 11/08; F01D 11/24; F05D 2240/11;
(Continued)

(56) References Cited

U.S. PATENT DOCUMENTS 4,573,865 A * 3/1986 Hsia ........................ F01D 5/187
165/109.1
5,353,865 A * 10/1994 Adiutori ................. F28F 13/02
165/109.1
(Continued)

FOREIGN PATENT DOCUMENTS

EP 1 225 305 A2 7/2002
EP 1 225 305 A3 7/2002
(Continued)

OTHER PUBLICATIONS

European Search Report dated Jul. 1, 2015.

*Primary Examiner* — Ninh H Nguyen
(74) *Attorney, Agent, or Firm* — Buchanan Ingersoll & Rooney PC (57) ABSTRACT

A wall for a hot gas channel in a gas turbine is described, the wall having a back side and a front side and an impingement sheet having impingement cooling holes, the wall being for exposure to a hot fluid at the front side, and the wall having an array of pins attached to the back side and extending between the back side and the impingement sheet, the wall additionally having a plurality of ribs attached to the back side, each rib extending between two pins to delineate an array of cells on the back side, and/or at least one compartment wall attached to the back side to delineate compartments on the back side. Embodiments include an impingement sheet with impingement cooling holes and cooling exit holes. A gas turbine including the wall is also described.

20 Claims, 6 Drawing Sheets

(51) Int. Cl.
*F01D 25/12* (2006.01)
*F02K 1/82* (2006.01)
*F23R 3/00* (2006.01)
*F28F 19/00* (2006.01)

(52) U.S. Cl.
CPC ............ *F23R 3/002* (2013.01); *F28F 19/002* (2013.01); *F05D 2240/11* (2013.01); *F05D 2240/15* (2013.01); *F05D 2240/81* (2013.01); *F05D 2260/201* (2013.01); *F05D 2260/212* (2013.01); *F05D 2260/22141* (2013.01); *F23R 2900/03044* (2013.01); *F23R 2900/03045* (2013.01); *Y02T 50/675* (2013.01)

(58) Field of Classification Search
CPC ......... F05D 2260/201; F05D 2260/202; F05D 2260/212; F05D 2260/22141
See application file for complete search history.

(56) References Cited

U.S. PATENT DOCUMENTS

| | | | |
|---|---|---|---|
| 5,782,294 A | 7/1998 | Froemming et al. | |
| 6,779,597 B2 * | 8/2004 | DeMarche | F01D 11/24 165/169 |
| 6,974,308 B2 * | 12/2005 | Halfmann | B22C 9/04 415/115 |
| 7,186,084 B2 * | 3/2007 | Bunker | F01D 5/187 416/241 R |
| 7,306,424 B2 * | 12/2007 | Romanov | F01D 11/08 415/115 |
| 7,972,106 B2 * | 7/2011 | Bigi | F01D 11/08 415/115 |
| 2002/0098079 A1 | 7/2002 | Fujikawa et al. | |
| 2005/0106021 A1 | 5/2005 | Bunker et al. | |
| 2005/0118023 A1 | 6/2005 | Bunker et al. | |
| 2009/0035125 A1 | 2/2009 | Fujimoto et al. | |
| 2009/0139221 A1 | 6/2009 | Farah et al. | |

FOREIGN PATENT DOCUMENTS

| | | |
|---|---|---|
| EP | 1 533 475 A2 | 5/2005 |
| EP | 1 533 475 A3 | 5/2005 |
| EP | 1 783 350 A2 | 5/2007 |
| EP | 1 783 350 A3 | 5/2007 |
| EP | 1 990 507 A1 | 11/2008 |
| EP | 2 754 857 A1 | 7/2014 |
| JP | 61-187501 A | 8/1986 |

* cited by examiner

WALL FOR A HOT GAS CHANNEL IN A GAS TURBINE

TECHNICAL FIELD

This invention relates to gas turbines, and particularly to walls for hot gas channels in gas turbines.

BACKGROUND OF THE INVENTION

Various parts in gas turbines are subject to high temperatures, and as a result are liable to degrade or disintegrate. One set of such parts is internal hot gas surfaces or walls. These surfaces can be cooled from the back side (cold side) to improve their lifetime. However, lifetime is still limited, and once failure starts to occur (for example a crack), then the part must soon be replaced, as the damage is liable to rapidly spread. This is particularly the case once any crack becomes big enough that significant cooling air is lost through the hole, reducing cooling effectiveness. As an example, an impingement cooled back side allows cracks or openings of a maximum area of the sum of all impingement holes feeding that area in order to remain functional.

It has therefore been appreciated that improvements can be made to provide more durable and better cooled hot gas surfaces.

SUMMARY OF THE INVENTION

The invention is defined in the appended independent claims to which reference should now be made. Advantageous features of the invention are set forth in the dependent claims.

According to a first aspect of the invention, there is provided a wall for a hot gas channel in a gas turbine, the wall having a back side (cold side) and a front side (hot side) and an impingement sheet comprising impingement cooling holes, the wall being for exposure to a hot fluid at the front side, and the wall comprising an array of pins attached to the back side and extending between the back side and the impingement sheet, the wall additionally comprising a plurality of ribs attached to the back side, each rib extending between two pins to delineate an array of cells on the back side, and/or at least one compartment wall attached to the back side to delineate compartments on the back side.

These two different options, firstly delineating an array of cells, and secondly delineating compartments, both solve a number of similar problems and provide a number of similar advantages. Providing cells limits the impact of damage to the hot gas surface by restricting cracks and limiting hole size. Compartments also limit the impact of damage to the hot gas surface, again by keeping the impact local. Both these options can therefore improve part lifetime.

Part lifetime is improved due to increased ease of assessment on defect allowances (i.e. how many defects can be tolerated) and whether parts can continue to be used or need replacing or repairing. The number of defects that can be allowed can also be increased. Tolerance to damage (cracks, openings, holes) in the hot gas surface is increased. Wall disintegration during emergency lifetime period can be better controlled and can be localised and slowed down.

Providing ribs and/or compartments also improves wall strength. Ribs in particular can improve heat transfer, and therefore cooling. Compartments in particular can contain cooling disruption created by cracks or holes, so that cooling effectiveness is only reduced locally. Ribs in particular can restrict crack and/or hole growth.

Preferably, separate impingement cooling holes are provided for each of the cells. This can allow for uniform cooling.

In another embodiment, the wall additionally comprises cooling exit holes. This can streamline removal of heated cooling air.

In another embodiment, the wall additionally comprises a second wall attached to and substantially perpendicular to the wall. This can improve wall strength.

In another embodiment, each compartment contains an array of pins and an array of cells.

In another embodiment, the back side of the wall, the pins and the ribs are integrally cast. This can improve part lifetime and stability.

A second aspect of the invention comprises a gas turbine comprising a wall as described above.

A third aspect of the invention comprises a method of cooling a wall for a hot gas channel as described above, comprising the step of impinging a cooling fluid on the back side of the wall.

In an embodiment, the wall additionally comprises cooling exit holes, and the method comprises the steps of impinging a cooling fluid on the back side of the wall through the cooling holes in the impingement sheet, and feeding a cooling fluid away from the wall through the cooling exit holes. Preferably, the cooling fluid is impinged into each cell.

BRIEF DESCRIPTION OF THE DRAWINGS

An embodiment of the invention will now be described by way of example only and with reference to the accompanying drawings in which.

DETAILED DESCRIPTION OF THE PREFERRED EMBODIMENTS

Figure 1:
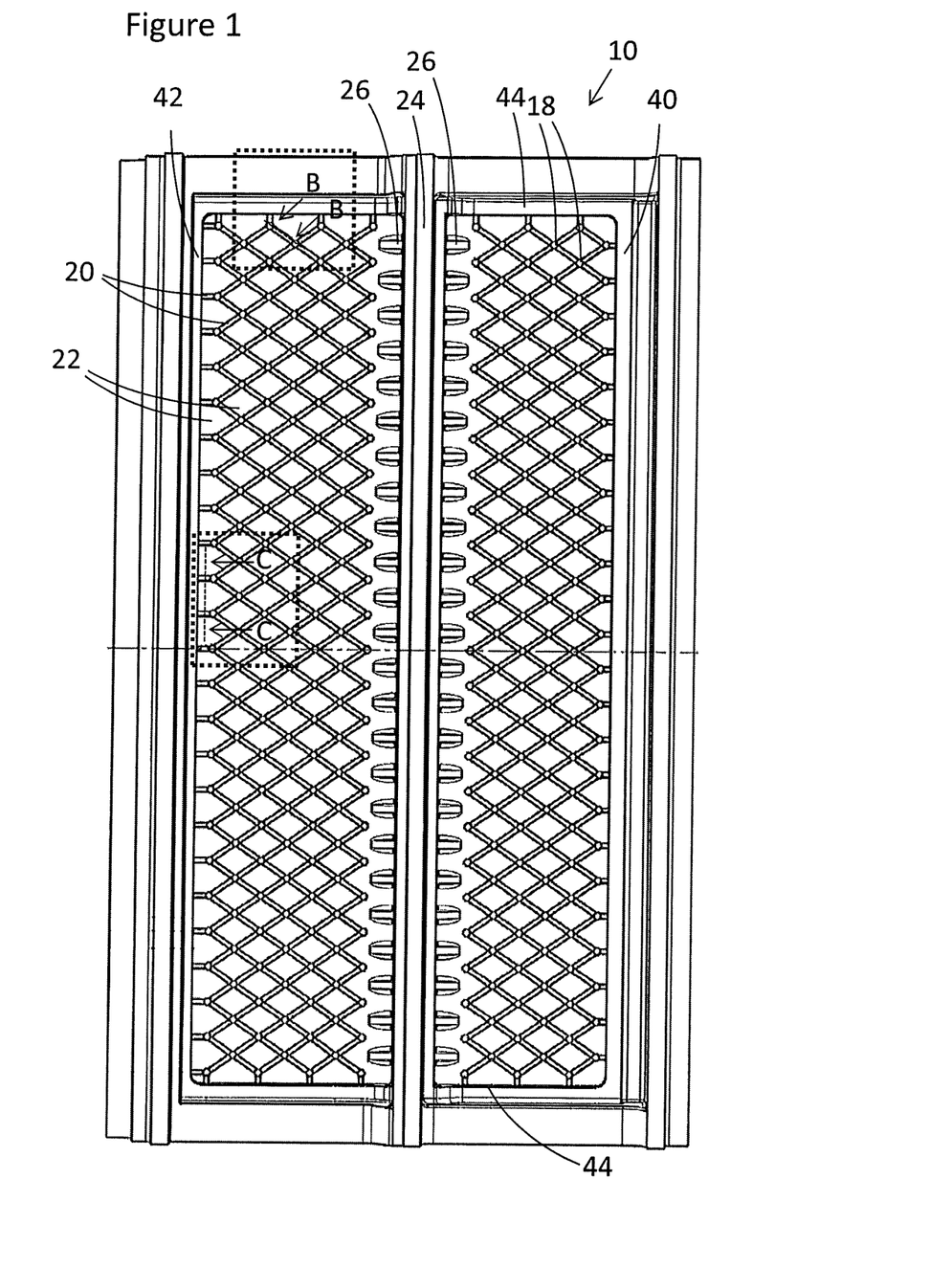
FIG. 1 shows a top view of a wall for a gas turbine according to an embodiment of the invention.
Figure 1B:
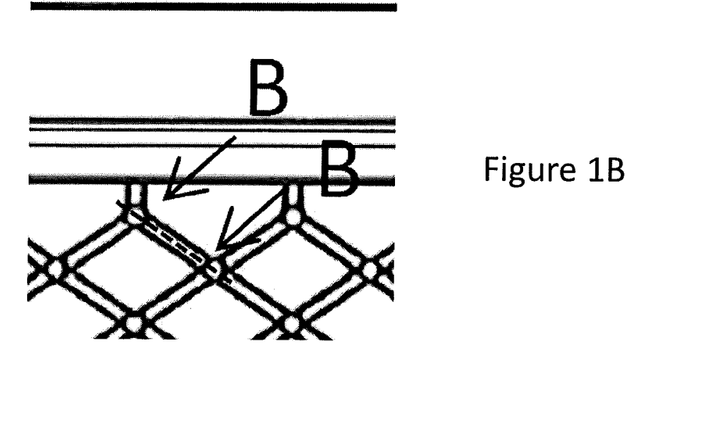
FIGS. 1B and 1C show enlarged portions of FIG. 1 in the sections shown by dotted lines around B-B and C-C.
Figure 1C:
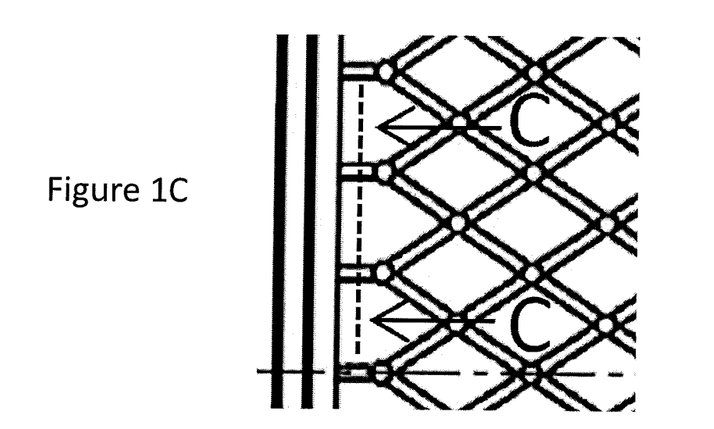
Figure 2:
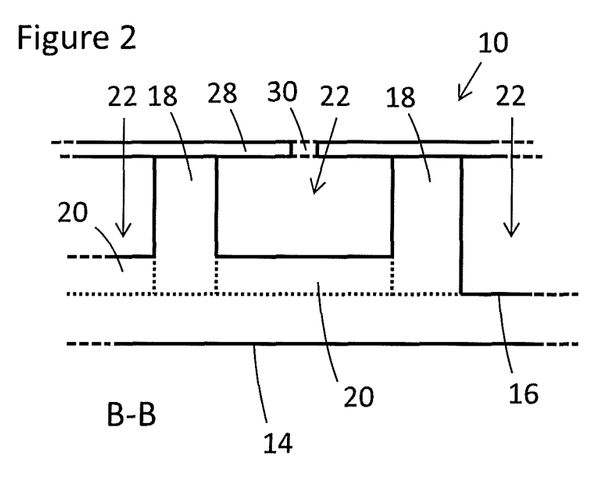
FIG. 2 shows a cross-section along B-B in FIG. 1.

FIG. 1 and FIG. 2 (a cross-section along B-B in FIG. 1) show a wall 10 for a gas turbine, the wall being for exposure to a hot fluid such as hot exhaust gas on a front side 14. On a back side 16 of the wall, an array of pins 18 is attached. Ribs 20 extend between the pins, and are attached to both the pins and the back wall. The ribs delineate cells 22 on the back side of the wall.

Optionally, a second wall 24 may be provided, attached to and substantially or completely perpendicular to the back side 16 of the wall. Reinforcement ribs 26 may be attached to the wall and the second wall for structural support.

FIG. 2 additionally shows an impingement sheet 28, which is added adjacent to the pins. Impingement cooling holes 30 can be provided in the impingement sheet 28. The impingement cooling holes would normally be provided over the centre of a cell 22, so the impingement cooling hole shown in FIG. 2 is actually set back behind the other features shown.

In FIG. 2, the dotted lines show the delineation of the components to aid clarity, and do not necessarily show physical features.

Figure 3:
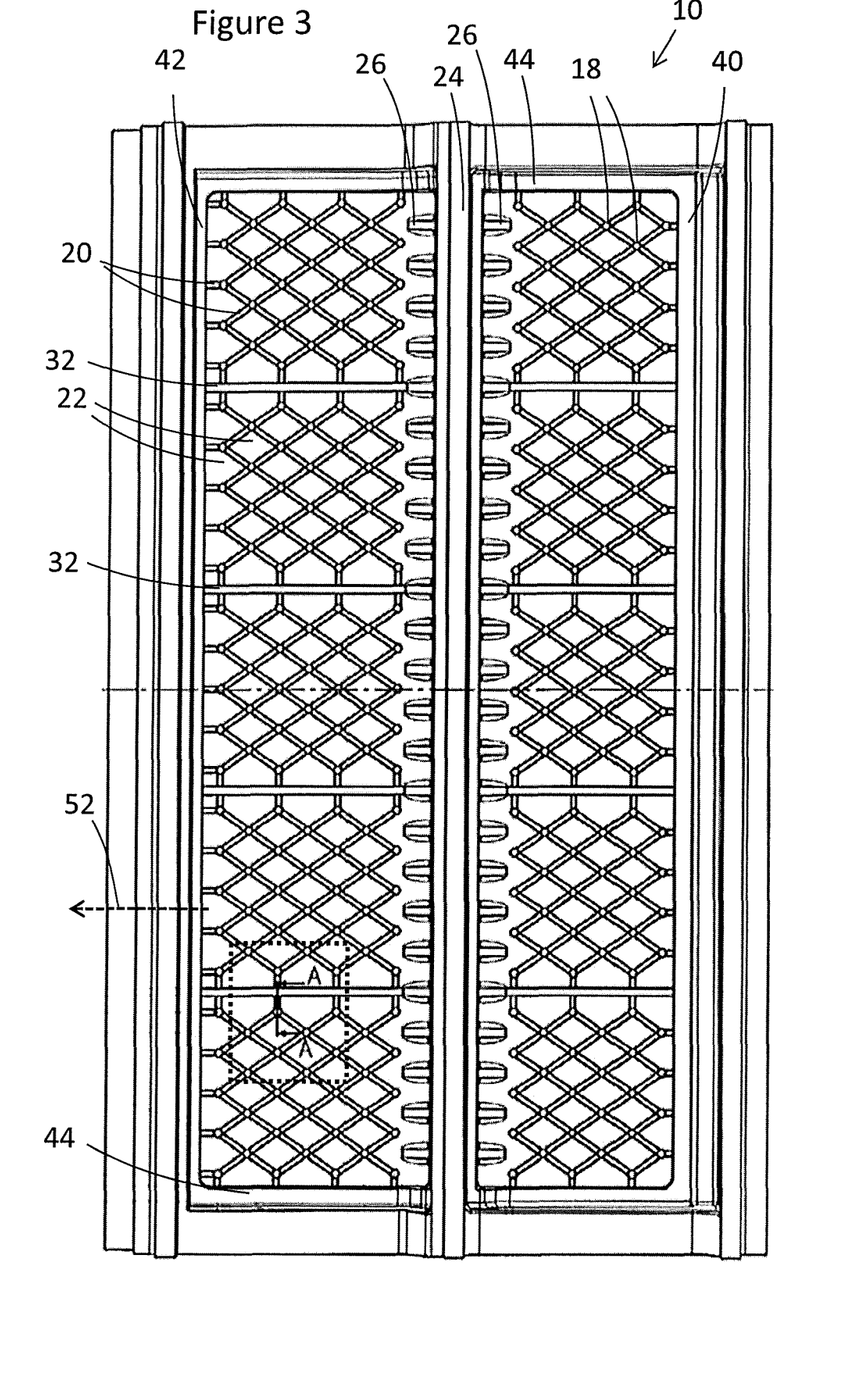
FIG. 3 shows a top view of a wall for a gas turbine according to another embodiment of the invention.
Figure 3A:
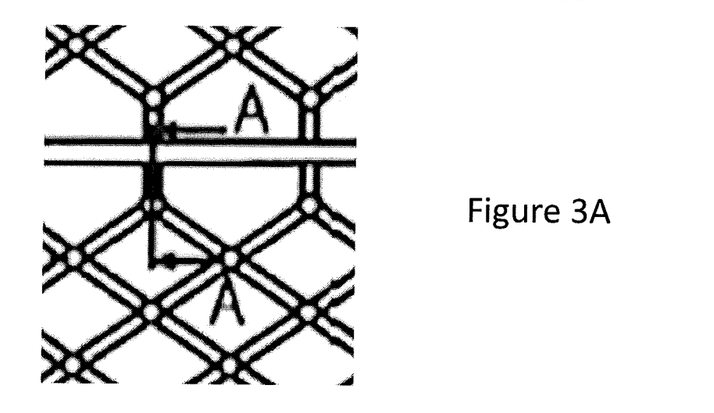
FIG. 3A shows an enlarged portion of FIG. 3 in the section shown by a dotted line around A-A.

FIG. 3 shows an embodiment similar to FIG. 1, in which additional compartment walls 32 are provided. These split up the back face of the wall into compartments, each compartment comprising a plurality of cells.

Figure 4:
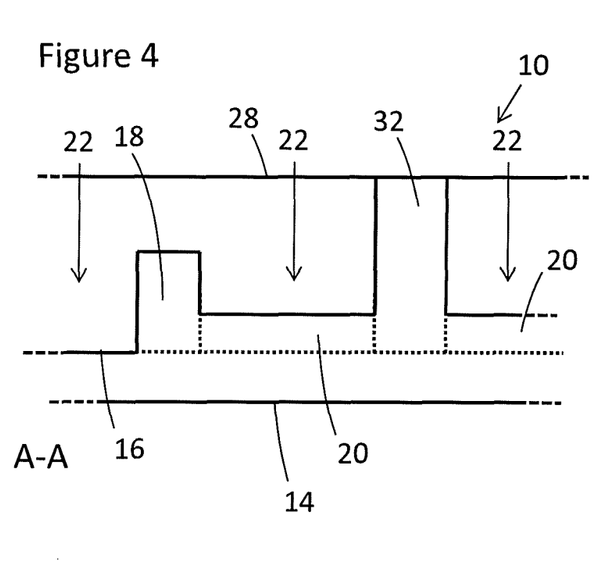
FIG. 4 shows a cross-section along A-A of FIG. 3.

FIG. 4 shows a cross-section along A-A in FIG. 3. In FIG. 4, an impingement sheet 28 is provided adjacent to the compartment walls 32. Alternatively, impingement sheets may be provided adjacent the pins, with a separate impingement sheet for each compartment. Impingement holes (not shown) are also provided in the impingement sheet as described elsewhere in this specification.

Figure 5:
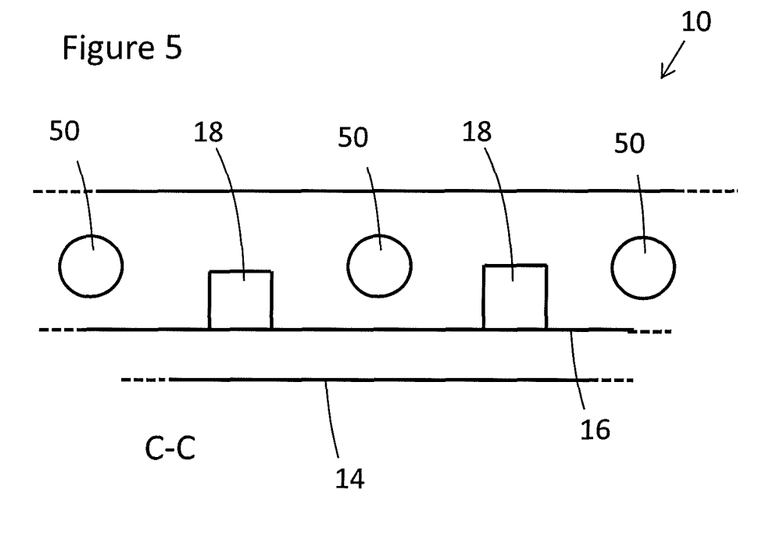
FIG. 5 shows a cross-section along C-C of FIG. 1.

FIG. 5 shows a cross-section along C-C in FIG. 1. In FIG. 1, a front edge 40 (leading edge), back edge 42 (trailing edge) and side edges 44 are shown, delineating the outside edge of the cooling area. At one or more of these sides, cooling exit holes 50 may be placed, such as those shown in FIG. 5. The cooling system in FIG. 5 could also be used in the embodiment of FIG. 3.

Figure 6:
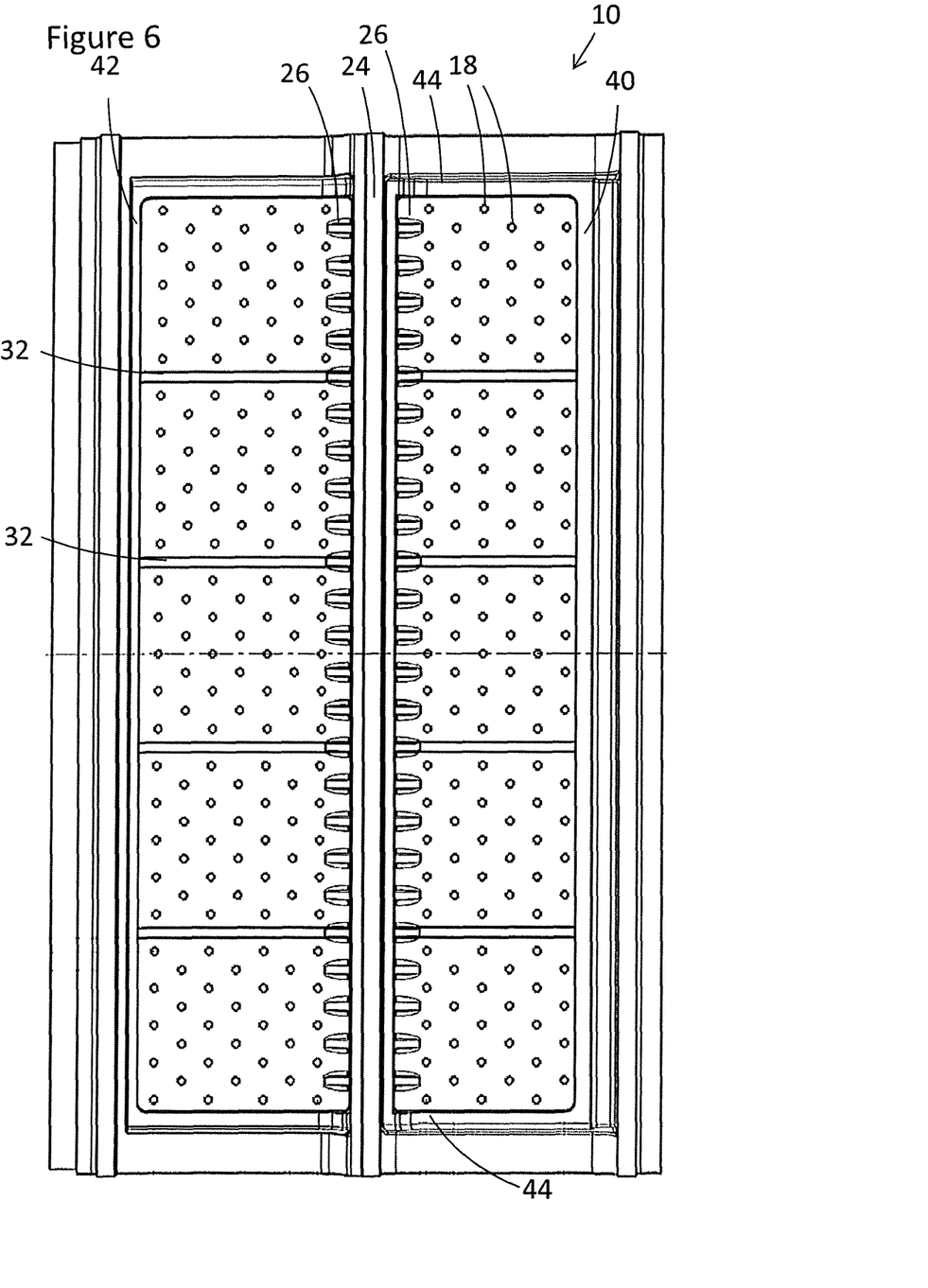
FIG. 6 shows a top view of a wall for a gas turbine according to another embodiment of the invention.

FIG. 6 shows an embodiment similar to FIG. 2 but in which only compartments are provided and no cells.

During use, a cooling fluid such as cooling air is provided, preferably through impingement holes 30 in the impingement sheet 28. The cooling fluid then impinges on the back side 16 of the wall 10, cooling the wall. The cooling fluid then filters away around the pins 18 to the edge of the array of cells 22 (so at the front edge, back edge, side edges and/or a second wall), where it leaves via the cooling exit holes 50.

During gas turbine inspection, a borescope can be used to inspect gas turbine parts such as the front side of the wall of the present invention. Gas turbine hot gas walls are liable to degrade, and upon inspection of the front side, damage to the hot gas wall can be seen.

In the event that damage is present, particularly cracks or holes, the ribs of the present invention can restrict the damage and stop cracks or holes from expanding beyond the limit of a single cell. This means that the damage is contained and the wall may continue to be used without repair or replacement for longer than in walls without ribs, where cracks or holes could expand across large areas of the wall. The remaining emergency lifetime (the time that the component may continue to be used even when damaged, such as the time after a crack or a hole or another type of failure) can therefore be increased and better predicted since crack propagation will normally be stopped.

In embodiments where compartments are included, the compartments enable further damage control by cooling air separation. In the event that enough cracks or holes have appeared within the cells in a compartment to render the cooling provided by the cooling fluid flow ineffective, the loss of cooling effectiveness is limited only to that compartment, as the cooling in other compartments is essentially independent. This limits damage, and can allow for further emergency lifetime extension. Acceptance limits are part specific, and in some embodiments, even an opening in the wall encompassing a whole compartment may be tolerated.

The wall 10 can be used in a front stage stator heat shield of a gas turbine, for example, or on other cooled stator parts or heat shields. The wall can also be used in various other parts of a gas turbine where a wall has a hot fluid on one side (the front side) and can be cooled by cooling air on the other side (the back side). In some cases, the cells and/or compartments may only extend over part of the wall.

The wall can also be considered as a wall part, which is the substantially featureless base structure with various protrusions (i.e. pins, ribs and optionally compartment walls) attached to it. The wall part, along with the pins and the ribs, are preferably integrally cast as a single component. In FIG. 2 and FIG. 4, dotted lines are shown to delineate these integrally cast parts.

The front side 14 may be coated with a heat resistant layer (thermal barrier coating).

The pins 18 in FIG. 4 are shown as shorter than the compartment wall. In some embodiments, the pins may be the same height as the compartment wall. The impingement sheet would then be adjacent to (with no gap or only a small separating gap of, for example, up to 10% of the distance between the back side and the impingement sheet) both the compartment wall and the pins, instead of just the compartment wall. Separate impingement sheets may be provided for each compartment.

Preferably, the ribs 20 are attached to both the pins and the back side of the wall, but in some embodiments the pins may be attached to only the back side of the wall. The height of the rib may be similar to (of the order of) the thickness of the wall between the front side and the back side. Alternatively or additionally, the height of the ribs is less than 50% and preferably less than 30% of the distance between the back side and the impingement sheet. Generally, all the ribs would be the same height, although ribs of varying heights could also be used. Generally, ribs are not intended to restrict cooling fluid flow, in contrast to compartment walls.

Most of the cells 22 are shown as diamond shaped in FIGS. 1 and 3, but various other shapes including rectangles, triangles, hexagons and irregular shapes could also be used. Most of the cells will preferably be the same shape, but cells adjacent to the edge (be it front edge, back edge, compartment wall, or second wall) may be a different shape. This can avoid large numbers of very small cells around the edge; small cells may be more difficult to cool.

A cell is a delineated area of the back side, and each cell is surrounded, normally by ribs, wherein the ribs form a continuous wall around the cell. Edges (front edge, back edge, side edges and/or second wall) may also delineate part of a cell. In this way, crack propagation may be limited in a more controlled and more predictable manner than in existing solutions, allowing forecasting of the maximum crack size when a crack is detected.

The second wall 24 provides structural strength and may also delineate compartments. Adjacent to the second wall, the impingement sheet may curve away from the back side of the wall, angling the impingement sheet up towards the direction of the side of the second wall (which is perpendicular to the wall). Impingement holes near the second wall will then be angled towards the second wall, and will help with cooling of the wall to second wall joint. The impingement sheet near the second wall may be arranged as disclosed in European patent application 13150882.2, published as EP2754857, which is hereby incorporated by reference in its entirety, particularly with reference to FIGS. 1 and 4 and the associated description in the detailed description of the invention. The second wall is preferably integrally casted as part of the wall. The reinforcement ribs 26 are also preferably integrally casted as part of the wall or the second wall.

In embodiments with a second wall 24, the two areas either side of the second wall may have cooling air at different pressures. Typically, in the direction parallel to the second wall, the pressure will not significantly change.

The impingement sheet 28 may be adjacent to the pins as shown in FIG. 2, or alternatively there may be a small gap between the pins and the impingement sheet to allow for relative movement such as movement due to differing thermal expansion. The impingement sheet and the pins are preferably free to move relative to one another, and are not directly attached to one another. The pins preferably extend at least 90% of the distance from the back side 16 to the impingement sheet 28.

An impingement cooling hole 30 is provided for at least most of the cells, and preferably an impingement hole is provided for each cell. Impingement holes are preferably situated over the centre of each cell.

The cooling fluid may filter to any one side, but preferably filters to all sides, as this provides a more uniform cooling effect than filtering to one side. Cooling exit holes 50 can be placed in the front edge, back edge, side edge, compartment wall and/or second wall. One or more cooling exit holes may be included. There can be one cooling exit hole for each of the cells adjacent to the edge of the wall, compartment wall and/or second wall. The cooling exit holes can lead to cooling channels in the edges (front edge, back edge, side edges), to convectively cool the edges. Cooling air can exit from the cooling exit holes directly (in cooling air exit direction 52, for example) or via cooling channels to purge a gap between adjacent panels; for example when two panels (walls) such as those shown in FIG. 2 are placed adjacent to one another. The cooling exit holes are shown as circular in cross section in FIG. 5, but may be other shapes.

Compartment walls 32 at least partly delineate compartments comprising a plurality of cells. Compartment walls completely or largely restrict cooling fluid flow, in contrast to ribs which are not intended to stop the cooling fluid flow. Compartment walls therefore preferably extend for at least 80% or at least 90% of the distance from the back side to the impingement sheet. The compartment walls may be attached to the impingement sheet, or alternatively may not be attached and free to move relative to one another.

Compartments can be delineated in several ways; in the example of FIG. 3 some compartments are delineated on two sides by compartment walls, on a third side by the second wall, and on the fourth side by the front edge or back edge. Other compartments are delineated by a compartment wall on one side, a second wall on a second side, the front edge or back edge on a third side, and a side edge on the fourth side. Compartments could also be entirely delineated by compartment walls. Various other combinations are possible, depending on the size and number of compartments and on whether one or more second walls is provided.

The front edge 40, back edge 42 and side edges 44 delineate a cooling area or a cooling fluid flow area, as do second walls 24. Depending on the geometrical shape of the wall, side wall features may be unnecessary, such as with pipe walls. The side wall features may support the impingement sheet and connect or help connect the impingement sheet to the other features of the wall. Generally, these side wall features would completely or largely restrict cooling flow, with the exception of any cooling exit holes.

Cooling holes for film cooling (not shown) may be provided through the wall; these would extend from the back side to the front side.

Various modifications to the embodiments described are possible and will occur to those skilled in the art without departing from the invention which is defined by the following claims.

| REFERENCE SIGNS | |
| --- | --- |
| 10 | wall |
| 14 | front side |
| 16 | back side |
| 18 | pin |
| 20 | rib |
| 22 | cell |
| 24 | second wall |
| 26 | reinforcement rib |
| 28 | impingement sheet |
| 30 | impingement cooling hole |
| 32 | compartment wall |
| 40 | front edge |
| 42 | back edge |
| 44 | side edge |
| 50 | cooling exit hole |
| 52 | cooling air exit direction |

The invention claimed is:

1. A wall and an impingement sheet for a hot gas channel in a gas turbine, the wall and the impingement sheet comprising:
   the wall having a back side and a front side, the impingement sheet having impingement cooling holes, the impingement sheet being provided at a distance from the back side of the wall, the wall being configured for exposure to a hot fluid at the front side, and the wall having an array of pins attached to the back side and extending between the back side and the impingement sheet; and
   at least one of:
      a plurality of ribs attached to the back side, each rib extending between two pins to delineate an array of cells on the back side, wherein a height of each of the plurality of ribs is less than 50% of a distance between the back side and the impingement sheet, and
      at least one compartment wall attached to the back side to delineate compartments on the back side and the at least one compartment wall extends for at least 90% of a distance from the back side to the impingement sheet.

2. The wall and the impingement sheet of claim 1, wherein separate impingement cooling holes are provided for each of the array of cells.

3. The wall and the impingement sheet of claim 1, comprising:
   a cooling area of the wall, which is delineated by a front edge, a back edge, and side edges, and wherein cooling exit holes in one of the front edge, the back edge, and the side edges.

4. The wall and the impingement sheet of claim 1, comprising:
   a second wall attached to and extending substantially perpendicular to the back side of the wall.

5. The wall and the impingement sheet of claim 1, wherein each compartment contains an array of pins attached to the back side and extending between the back side and the impingement sheet, and an array of cells delineated by the plurality of ribs extending between the array of pins.

6. The wall and the impingement sheet of claim 1, wherein the back side of the wall, the array of pins and the plurality of ribs are integrally cast.

7. A gas turbine comprising the wall and the impingement sheet of claim 1.

8. The wall and the impingement sheet of claim 1, wherein each of the plurality of ribs is of a same height.

9. A method of cooling a wall and an impingement sheet for a hot gas channel in a gas turbine, the wall having a back side and a front side, the impingement sheet having impingement cooling holes, the impingement sheet being provided at a distance from the back side, the wall being configured for exposure to a hot fluid at the front side, and the wall including an array of pins attached to the back side and extending between the back side and the impingement sheet, and at least one of a plurality of ribs attached to the back side, each rib extending between two pins to delineate an array of cells on the back side, wherein a height of each of the plurality of ribs is less than 50% of a distance between the back side and the impingement sheet, and at least one compartment wall is attached to the back side to delineate compartments on the back side and the at least one compartment wall extends for at least 90% of a distance from the back side to the impingement sheet, the method comprising:

exposing the front side of the wall to a hotter fluid; and impinging a cooling fluid on the back side of the wall.

10. The method of claim 9, wherein the wall and the impingement sheet includes a cooling area of the wall, which is delineated by a front edge, a back edge, and side edges, and cooling exit holes in one of the front edge, the back edge, and the side edges, and the method further comprises:

impinging the cooling fluid on the back side of the wall through the cooling holes in the impingement sheet, and feeding the cooling fluid away from the wall through the cooling exit holes.

11. The method of claim 9, wherein the cooling fluid is impinged into each cell.

12. The method of claim 9, further comprising:

providing separate impingement cooling holes for each cell of the array of cells.

13. The method of claim 9, further comprising:

a second wall attached to and extending substantially perpendicular to the back side of the wall.

14. The method of claim 9, wherein each compartment contains an array of pins attached to the back side and extending between the back side and the impingement sheet, and an array of cells delineated by the plurality of ribs extending between the array of pins.

15. The method of claim 9, further comprising:

integrally casting the back side of the wall, the array of pins, and the plurality of ribs.

16. A wall and an impingement sheet for a hot gas channel in a gas turbine, the wall and the impingement sheet comprising:

the wall having a back side and a front side, the impingement sheet having impingement cooling holes, the impingement sheet being provided at a distance from the back side, the wall being configured for exposure to a hot fluid at the front side, and the wall having an array of pins attached to the back side and extending between the back side and the impingement sheet;

a plurality of ribs attached to the back side, each rib extending between two pins to delineate an array of cells on the back side, wherein a height of each of the plurality of ribs is less than 30% of a distance between the back side and the impingement sheet; and at least one compartment wall is attached to the back side to delineate compartments on the back side and the at least one compartment wall extends for at least 90% of a distance from the back side to the impingement sheet.

17. The wall and the impingement sheet of claim 16, wherein separate impingement cooling holes are provided for each of the cells.

18. The wall and the impingement sheet of claim 16, comprising:

a cooling area of the wall, which is delineated by a front edge, a back edge, and side edges, and wherein cooling exit holes are in one of the front edge, the back edge, and the side edges.

19. The wall and the impingement sheet of claim 16, comprising:

a second wall attached to and extending substantially perpendicular to the back side of the wall.

20. The wall and the impingement sheet of claim 16, wherein each compartment contains an array of pins attached to the back side and extending between the back side and the impingement sheet, and an array of cells delineated by the plurality of ribs extending between the array of pins.

* * * * *